Jan. 12, 1926.                                            1,569,601
                         A. L. ANDERSON
                   COOKER FOR FOOD IN CONTAINERS
                      Filed May 1, 1925          3 Sheets-Sheet 2
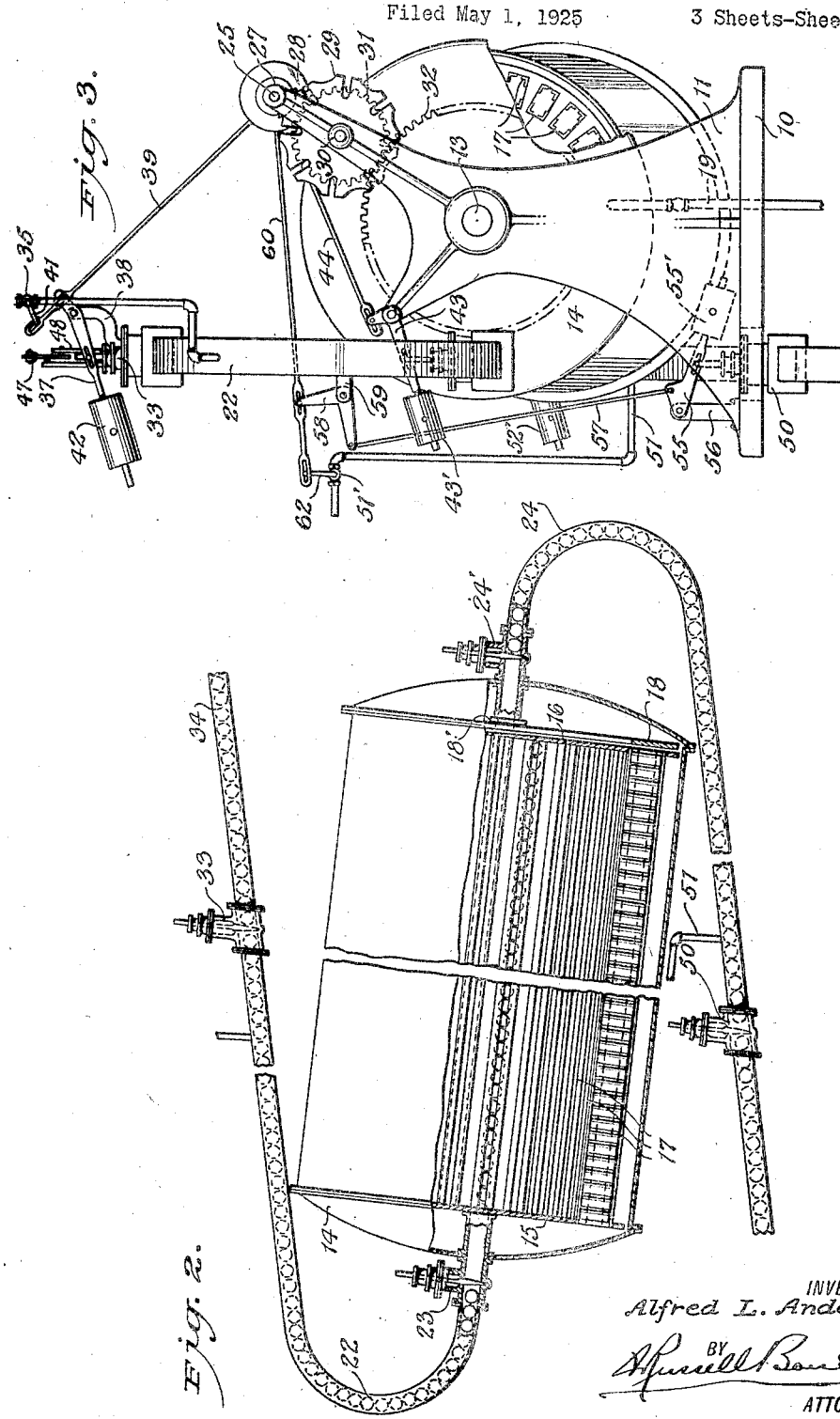
INVENTOR
Alfred L. Anderson
BY
ATTORNEY Jan. 12, 1926.  
A. L. ANDERSON  
COOKER FOR FOOD IN CONTAINERS  
Filed May 1, 1925  
1,569,601  
3 Sheets-Sheet 3

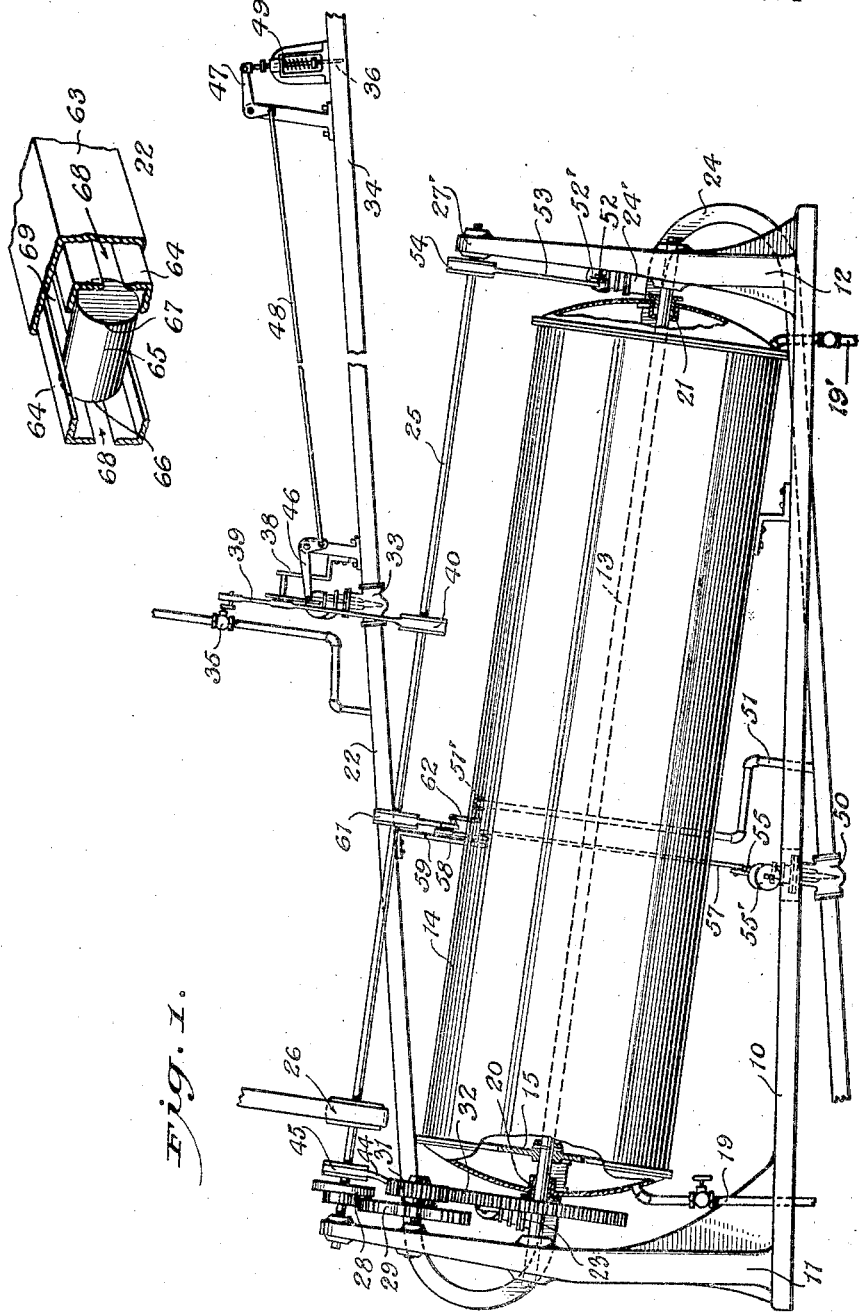

INVENTOR
Alfred L. Anderson
BY
ATTORNEY

Patented Jan. 12, 1926.

1,569,601

UNITED STATES PATENT OFFICE.

ALFRED L. ANDERSON, OF SEATTLE, WASHINGTON.

COOKER FOR FOOD IN CONTAINERS.

Application filed May 1, 1925. Serial No. 27,205.

*To all whom it may concern:*

Be it known that I, ALFRED L. ANDERSON, a citizen of the United States, and a resident of Seattle, in the county of King and State of Washington, have invented a new and Improved Cooker for Food in Containers, of which the following is a full, clear, and exact description.

My invention relates to a machine for heating, cooking or sterilizing food in cans or containers and has for one of its objects, to provide for feeding cans into a steam filled cooker and discharging the cans from the cooker.

Another object of my invention is to provide steam locks to limit the loss of steam during the feeding and discharge of the cans.

A further object is to provide an improved conduit for the cans which will prevent the cans from jamming therein.

With these and other objects in view, my invention consists in certain novel features of construction and combinations and arrangements of parts as will be more fully hereinafter described and pointed out in the claims.

Figure 1 is a view showing a side elevation of my improved machine for cooking food in cans;

Fig. 2 is a sectional view of the cooker proper, with inlet and discharge conduits connected therewith, but with the mechanism for operating the cooker and for operating valves in the conduits removed;

Fig. 3 is an end view of my machine partly broken away and viewed in the direction of the arrow 3, Fig. 1;

Fig. 4 is a fragmental perspective view of my improved conduit;

Figure 5:
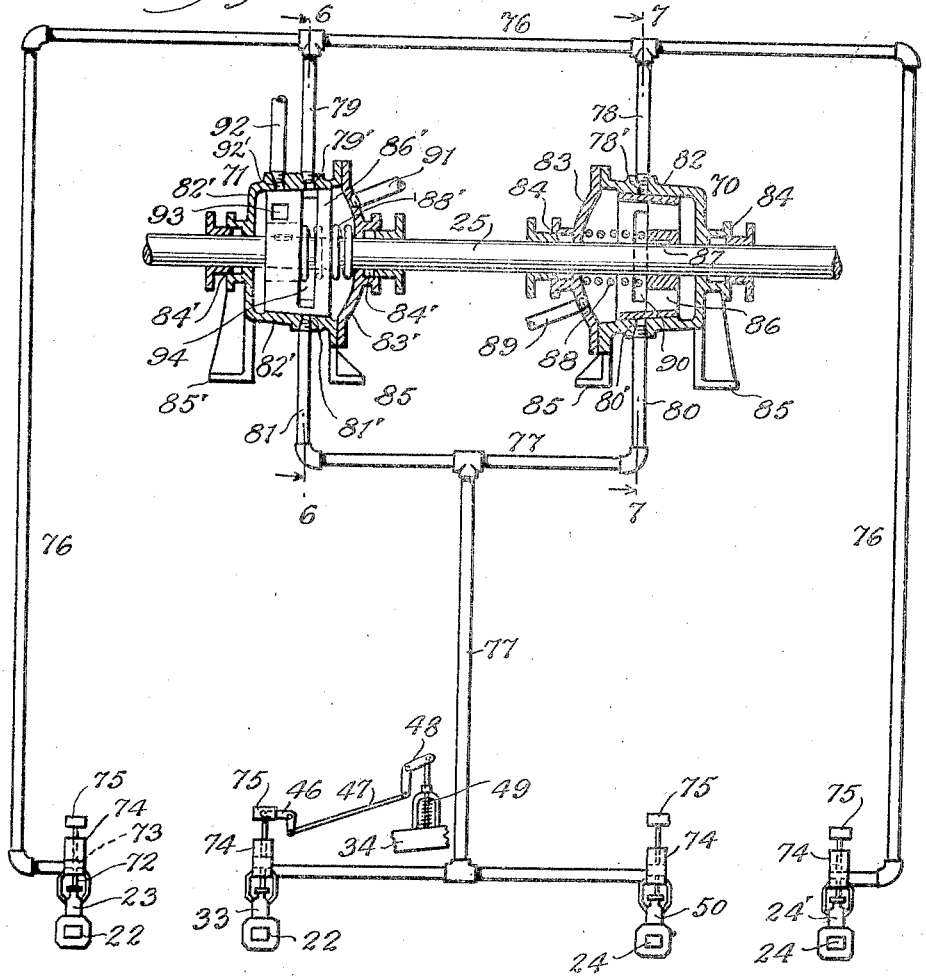
Fig. 5 is a view partly in section and largely diagrammatic, illustrating a modified mechanism for operating the steam locks of my cooker.

I have used the numeral 10 to indicate the base of my machine on which are formed two brackets 11 and 12. In these brackets are bearings for a shaft 13 which passes through the cooker proper. The latter consists of a stationary shell 14, within which is a rotatable cage mounted on the shaft 13. This cage consists of a pair of end disks 15 and 16 connected by means of racks 17. The racks are of rectangular form, large enough to admit the cans freely through them and each rack consists of four parallel angle bars, as clearly shown in section in Fig. 3. The end disks 15 and 16 have rectangular ports in them aligned with the racks 17 to admit the passage of cans therethrough. The cooker proper is set at such an angle to the horizontal that cans introduced in the upper or left hand end of the racks will roll down by gravity to the lower end. To prevent the cans from rolling out of the racks into the shell 14, a stationary end plate 18 is provided. Steam is admitted to the shell through a valve controlled pipe 19 and cooks the food in the cans carried by the racks. A pipe 19' at the lower or right hand end of the shell serves to carry off water of condensation. When the shaft 13 passes through the shell 14, leakage of steam is prevented by stuffing boxes 20 and 21.

Cans are fed into the cooker by gravity through an inlet conduit 22 which opens through the shell 14 at the left hand or upper end. A gate valve 23 controls the feed of the cans into the cooker. The cage is revolved intermittently so as to bring the racks 17 sucessively into line with the inlet conduit 22, and as each rack is brought into alignment with the inlet conduit, a charge of cans is introduced sufficient to fill the rack. At the lower or right hand end of the cooker, there is a discharge conduit 24 which passes through the shell 14 and is aligned with a discharge port 18' in the end plate 18. The position of this port is such that a rack after receiving a load of cans, must make almost a complete revolution before it is brought into alignment with the discharge port. A gate valve 24' in the discharge conduit controls the discharge of cans from the cooker.

To provide for intermittent angular motion of the racks, I employ a mechanism illustrated to best advantage in Fig. 3. A drive shaft 25 is provided which receives power from a suitable source by any desirable means such as a belt and pulley, as shown at 26 in Figure 1. This drive shaft is supported by bearings 27, 27' carried by the brackets 11 and 12 respectively. At one end of the drive shaft, there is a Geneva pinion 28 engaging a Geneva wheel 29. The latter is mounted on a stud 30 carried by the bracket 11. Secured to the wheel 29 is a pinion 31 which engages a gear wheel 32 on the shaft 13. By means of the Geneva gearing, an intermittent motion is imparted to the shaft 13 and the gear ratio between shafts 25 and 13 is such that at each rotation of the former, the latter is turned through an angle corresponding to that between a pair of racks 17, but each movement of the racks 17 takes place while the shaft 25 is turning through but a part of a rotation and the racks are stationary while shaft 25 is completing the rest of its rotation. Thus at each rotation of shaft 25 a rack is brought into alignment with the inlet conduit 22 and is held stationary while it receives a charge of cans. The rack then proceeds in its orbit with a step by step movement, exposing the cans to the steam that fills the shell 14. Just before making a complete revolution, the rack is brought into alignment with the port 18' in the end plate 18. The cans are then discharged by gravity into the conduit 24 and the empty rack on its next step is brought into alignment with conduit 22 from which it receives a fresh charge of cans.

In order to economize space and to make my machine more compact, I find it deirable to curve the inlet and discharge conduits 22 and 24 respectively, so that they extend back over and under the shell 14. The conduit 22 is steam tight and in addition to the gate valve 23, is provided with a gate valve 33. An extension 34 of the conduit 22 does not need to be steam tight and could in fact consist of an open rack. Cans may be fed into the conduit 34 by gravity or by any suitable means. After a charge of cans has been fed into the cooker, the gate valve 23 is closed and the gate valve 33 remains closed. The conduit 22 at that time is filled with steam at the pressure of that in the cooker. It is desirable to discharge this steam before fresh cans are introduced into the conduit 22. Accordingly, a discharge pipe fitted with a valve 35 is provided between the gate valves 23 and 33. When the valve 35 is opened, the pressure in the conduit 22 is reduced to normal atmospheric pressure. Thereupon the valve 33 is raised to permit a charge of cans to roll down into the conduit 22. At the same time a stop 36 in the conduit 34 is actuated to hold back such cans as are not needed to fill the space between valves 23 and 33.

The mechanism for operating the gate valves 23 and 33 and also the steam valve 35 and stop 36 is as follows: The valve 33, as shown in Fig. 3, is provided with a stem, which has pin and slot connection with one arm of a lever 37 fulcrumed in the bracket 38. (See Fig. 3.) The opposite end of the lever 37 also has pin and slot connection with a rod 39 connected to an eccentric 40 on shaft 25. An extension of the rod 39 has pin and slot connection with the operating lever 41 of valve 35. The lever 37 is provided with a counter-weight 42 to insure the lowering or closing of the gate valve 33. In a similar way the stem of gate valve 23 has pin and slot connection with one arm of a bell crank lever 43 fulcrumed in an extension of bracket 11. The other arm of the lever has pin and slot connection with a rod 44 which is connected with eccentric 45 on shaft 25.

There is a connection between valve 33 and the stop 36 whereby when the valve 33 is raised, the stop 36 is lowered. This connection consists of a pair of bell crank levers 46 and 47 connected by a link 48. The lever 46 has pin and slot connection with the stem of valve 33 while the lever 47 has pin and slot connection with the stop pin 36. A spring 49 serves normally to lower the pin 36 when the valve 33 is raised. The levers 46 and 47 and the link 48 operate to raise the stop pin 36 against the pressure of spring 49 when the valve 33 is lowered.

The discharge conduit 24 which is steam tight, is provided with two gate valves 24' and 50. When the gate valve 24' is raised to permit the discharge of a rackful of cans from the cooker, the valve 50 being closed, the cans are retained in the tube 24 and the tube is filled with steam at the pressure of that of the cooker. After the cans have been discharged into the conduit 24, the valve 24' is closed. Leading from the conduit 24 there is a steam outlet pipe 51 closed by a valve 51'. The valve 24' is operated in the same manner as is the valve 23 by means of bell crank lever 52 and eccentric rod 53 connected to the eccentric 54 on the drive shaft 25. The valve 50 is operated in a manner similar to valve 33. A lever 55 fulcrumed on a bracket 56 has pin and slot connection with the stem of valve 50 and is connected by a link 57 with a bell crank lever 58, fulcrumed in a bracket 59. The other arm of the bell crank lever has pin and slot connection with an eccentric rod 60 connected to an eccentric 61 on shaft 25. An extension of the rod 60 has pin and slot connection with the handle 62 of the steam discharge valve 51'.

Owing to the pin and slot connection between rod 44 and bell crank 43 and between lever 53 and bell crank 52, the valves 23 and 24' are raised during a period of the throw of eccentrics 45 and 54 respectively and are closed by the counterweights 43' and 52' respectively. The eccentrics 40 and 61 are set at an angle to the eccentrics 45 and 54. Accordingly the valves controlled by the rods 39 and 60 respectively are not actuated until after the valves 23 and 24' are closed. The pin and slot connection between rod 39, bell crank lever 37 and valve handle 41 are such that valve 35 is opened before valve 33 is opened and is closed after valve 33 has been closed by the counterweight 42. Similarly the pin and slot connections between rod 60, handle 62 and lever 58 are such that valve 52 is opened before valve 50 is opened and is closed after valve 50 has been closed by the counterweight 55'. Owing to the intermittent gearing between shaft 25 and shaft 13, the racks 17 are held stationary while the valves 23 and 24' are raised and lowered.

The operation of the machine is as follows:

Cans are fed into the conduit 34 by any suitable means and are held in check by the gate valve 33. We shall assume that a charge of cans has already been fed into the steam tight conduit 22 past the gate valve 33 and the rotation of the racks 17 has been checked momentarily by the Geneva movement 28 and 29 with one of the racks aligned with the conduit 24. As the shaft 25 revolves, eccentrics 45 and 54 operate to raise the gate valves 23 and 24'. As the valve 23 is raised, cans in the conduit 22 roll by gravity into the rack 17 which is aligned therewith. At the same time another rack 17 which is aligned with the port 18' in the plate 18, discharges its load of cans into the conduit 24. Immediately after this occurs, the valves 23 and 24' are closed by the counterweights 43' and 52' respectively. Further turning of the shaft 25 causes eccentrics 40 and 61 to open the steam valves 35 and 51' respectively, permitting escape of steam from the conduits 22 and 24, and immediately after the opening of these valves, further turning of eccentrics 40 and 61 causes valves 33 and 50 to open. As valve 33 rises, stop pin 36 is lowered and a fresh charge of cans rolls out of the conduit 34 into the conduit 22 while the cans in the conduit 34 which are not needed to fill a rack at this operation of the valves, are held in check by the pin 36. At the same time, raising of the valve 50 permits the discharge of cans from the conduit 24. The valves 33 and 50 are then closed by further turning of the eccentrics 40 and 61 respectively and immediately after the valves have been closed, the steam valves 35 and 51' are closed. On closing valve 33, the pin 36 is withdrawn permitting the cans in the conduit 34 to roll down until checked by the gate valve 33. In the meantime the Geneva movement will have caused the shaft 13 to rotate through an angle equal to that between each pair of racks 17, so that the rack which has just discharged its load of cans into the conduit 24 is now brought into alignment with the conduit 22. Thereupon, the cycle is repeated. At each rotation of the shaft 25, a fresh load of cans is fed into the boiler and a rackful of cans that had been subjected to steam heat is discharged from the boiler.

One of the difficulties of feeding cans by gravity, through a conduit lies in the fact that because of slight variations in sizes of cans, it is impossible to make a perfect running fit of the cans in the conduit and there is a possibility for loosely fitting cans to twist slightly so that their axes are not truly normal to the axis of the conduit. This causes one edge of the can to dig into the side of the conduit and jam. To avoid this difficulty, I have provided the conduits of rectangular section with angle bars at the four corners. This is shown clearly in Fig. 4, which represents a fragmentary view of the conduit 22. The outer steam tight casing of the conduit is indicated by the numeral 63 and the four angle bars by the numeral 64. A can is represented at 65 and is shown slightly canted with the end 66 slightly in advance of the end 67. The height of the vertical walls of the angle bars 64 is less than the radius of the can so that a space 68 is formed between them at each side of the conduit. The inner edges of the vertical walls are rounded, as shown in Fig. 4. Were the ends of the can confined by unbroken vertical walls the forward edge of end 67 would bite into the adjacent wall and jam the can, but since the vertical walls are formed with recesses or gaps 68, there is nothing for the extreme forward edge of the end 67 to bite into and contact with the rounded edges of the walls would take place further back on the perimeter of the end 67 so that jamming of the can is avoided. It is also of advantage to provide a recess or open space 69 between the horizontal walls of the angle bars 64 so that the cans will rest upon or be engaged by the walls near the ends of the cans, and any irregularities in cylindrical contour of the cans intermediate between the ends, would not effect the smooth rolling of the cans through the conduit. I have found this construction of conduit to be very satisfactory, not only in the straight sections of the conduit, but also in the curved sections. The same result is obtained in the racks 17 which as shown by Fig. 3, are composed of angle bars with ample space between them to prevent binding in case of slight skewing of the cans and also to prevent non-uniform rolling of the cans due to bulging or other irregularities in their cylindrical surface.

Figure 6:
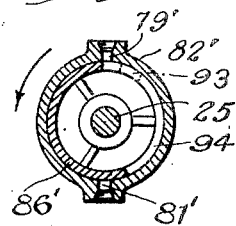
Fig. 6 is a cross section taken on line 6—6 of Fig. 5.
Figure 7:
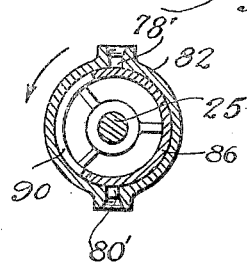
Fig. 7 is a cross section taken on line 7—7 of Fig. 5.

Figs. 5 to 7 illustrate a modification whereby the gate valves of the steam locks are steam operated instead of being mechanically operated. Fig. 5 is a diagrammatic view and is not intended to indicate the true locations of the gate valves but merely the operative relation between the valves. Like reference numerals are used to designate corresponding parts in the modification and the construction previously described. In the modification the eccentrics 40, 45, 54 and 61 together with their attendant link and lever connections are dispensed with and instead, two rotary steam valves 70 and 71 are mounted on the main driving shaft 25, the valve 70 being a steam inlet or supply valve and the valve 71 a steam outlet or discharge valve. Valves 70 and 71 serve to control the operation of the gate valves 23, 33, 50 and 24'. The location of these valves will be the same as indicated in Fig. 1.

Each of said gate valves has a stem 72 provided with a piston 73 operable in a steam cylinder 74. The steam cylinder is closed at its lower end and the stem 72 which projects from the top of the cylinder, carries a weight 75. Each cylinder 74 is provided with a steam port below the piston 73 so that on admission of steam, the piston will be raised and the gate valve opened, while on exhaust of steam or relief of steam pressure the weight 75 will cause the gate valve to return to closed position. It will be evident therefore that a single pipe line will suffice to provide for the admission and exhaust of steam. As shown in Fig. 5, a single pipe line 76 connects with cylinder 74 of gate valve 23 and also with cylinder 74 of gate valve 24', while another pipe line 77 connects with cylinders 74 of gate valves 33 and 50. The pipe line 76 communicates by way of a branch 78 with a port 78' in the rotary inlet valve 70 and by way of branch 79 with a port 79' in the rotary valve outlet 71, while the pipe line 77 is connected by a branch 80 with a port 80' in the rotary inlet valve 70 and by a branch 81 with a port 81' in the rotary outlet valve 71.

The valve 70 has a casing formed of a cup-shaped body shell 82 provided with a head 83. The casing is mounted upon the shaft 25, the latter passing through stuffing boxes 84 at each end of the casing. Legs 85 formed on the casing may be secured to a suitable support to prevent the casing from rotating. The interior of the shell 82 is provided with a tapered annular valve seat in which fits a tapered annular valve member 86. The latter is keyed to the shaft 25 as indicated at 87, or it may be secured to the shaft by any other desirable means. The valve member is pressed tightly against its seat by means of a spring 88. A pipe 89 supplies steam under pressure to the interior of the valve casing. A slot 90 is formed in the periphery of the valve 86 whereby steam under pressure may be lead to the cylinders 74 as ports 78' or 80' are uncovered by the slot 90. Similarly valve 71 has a casing formed of a cup-shaped shell 82' closed by a head 83', the shell and head each being formed with a stuffing box 84' through which passes the shaft 25. The casing is provided with legs 85' which may be secured to a suitable support to prevent the valve casing from rotating. The shell 82' is formed with a tapered annular seat adapted to receive a tapered annular valve 86' suitably secured to shaft 25 and urged to its seat by spring 88'. An exhaust pipe 91 communicates with the interior of the casing and a pipe 92 communicates with port 92' which opens into the seat of valve 86'. This pipe 92 is connected with the conduits 22 and 24 (Fig. 1) to permit of exhausting steam from said conduits prior to opening valves 33 and 50. The valve 86' differs from valve 86 in having a port 93 in the periphery thereof adapted to open communication between pipe 92 and the interior of the valve casing and is also provided with a port 94 adapted to establish communication between pipes 79 and 81 and the interior of the valve casing in proper timed relation.

In operation, as the shaft 25 rotates in the direction indicated by arrows in Figs. 6 and 7, the gate valves will be opened and closed in proper timed relation. For example, in the position shown in Figs. 5 and 6, the port 94 in valve 71 has established communication with the pipe line 76 whereby steam is exhausted from the cylinders 74 of gate valves 23 and 24'. Hence these valves have been moved to closed position by the weights 75. Immediately afterward port 92' is opened by port 93 establishing communication with pipe 92 and permitting steam to discharge from the conduits 22 and 24. On further rotation of shaft 25 port 92' is closed and port 80' is uncovered by valve 86 admitting steam to cylinders 74 of the gate valves 33 and 50 and causing said gate valves to rise. A fresh charge of cans then rolls into the conduit section 22 while the cans in the conduit 24 are discharged past the gate valve 50. As the shaft continues to rotate port 80' is closed by valve 86 and thereafter port 81' is opened by valve 86' permitting gate valves 33 and 50 to be closed by gravity. Still further rotation of shaft 25 causes port 78' to open and raise gate valves 23 and 24' thereby permitting the cans in conduit section 22 to discharge into the cooker and a rackful of cans to discharge from the cooker into the conduit section 24. At the completion of one rotation of the shaft 25 the ports will assume the positions shown in Fig. 5. Thus the cycle continues.

The stop mechanism 49 which is adapted to hold back cans in the conduit 34 while a charge is being delivered to the conduit section 22, is operated by the link and lever mechanism corresponding to that shown in Fig. 1, the lever 46 being in this case connected to the weight 75 of valve 33 as shown in Fig. 5.

In addition to the modification above described it will be evident that numerous changes and alterations might be made in the general form of the parts described without departing from the invention, and hence I do not wish to limit myself to the details set forth, but shall consider myself at liberty to make such slight changes and alterations as fall fairly within the spirit and scope of the appended claims.

I claim:

1. In a cooker for food in containers, a boiler, a chute for containers, a valve controlling communication between the boiler and one end of the chute, a valve adapted to close the other end of the chute, positive means for opening said valves in timed relation to each other, and non-positive means for closing said valves.

2. In a cooker for food in containers, a steam boiler, a tubular chute for containers, a valve controlling communication between the boiler and one end of the chute, a valve adapted to close the other end of the chute, positive means for opening said valves in timed relation to each other, and counterweights for closing said valves.

3. In a cooker for food in containers, a steam boiler, a tubular conduit connected to the boiler and adapted to convey containers into the boiler, two relatively spaced valves in the conduit near opposite ends thereof, each valve being adapted to effect steam tight closure of said conduit, and means for operating said valves in timed relation to each other.

4. In a cooker for food in containers, a steam boiler, a steam tight conduit for containers connected thereto, a discharge valve in the conduit for controlling communication between the boiler and one end of the conduit, an inlet valve in the conduit for closing the other end of the conduit, and means for operating said valves in timed relation to each other.

5. In a cooker for food in containers, a steam boiler, a steam tight conduit for containers connected thereto, a discharge gate valve in the conduit for controlling communication between the boiler and one end of the conduit, an inlet gate valve in the conduit for closing the other end of the conduit, a steam valve communicating with the conduit intermediate between said gate valves, and means for operating the gate valves and steam valve in timed relation to one another.

6. In a cooker for food in containers, a steam boiler, a steam tight conduit for the containers and connected to the boiler, a valve in the conduit controlling communication between the boiler and one end of the conduit, a second valve adapted to close the other end of the conduit, a steam discharge valve communicating with the conduit intermediate said aforementioned valves, and means for operating all of said valves in timed relation to one another.

7. In a cooker for food in containers, a steam boiler, a steam tight conduit for the containers and connected to the boiler, a discharge valve in the conduit controlling communication between the boiler and one end of the conduit, an inlet valve adapted to close the other end of the conduit, a steam valve communicating with the conduit intermediate said discharge and inlet valves, and means for successively opening the discharge valve, closing the same, opening the steam valve, opening the inlet valve, closing the inlet valve, and closing the steam valve.

8. In a cooker for food in containers, a steam boiler, an inlet steam lock connected to one end of the boiler, an outlet steam lock connected to the other end of the boiler, inclined racks revoluble within the boiler, the capacity of said inlet and outlet locks being each equal to the capacity of one of said racks, and means for admitting containers by gravity from the inlet lock to one of the racks, and simultaneously discharging containers by gravity from another of the racks into the outlet steam lock.

9. In a cooker for food in containers, a steam boiler, an inlet steam lock connected to one end of the boiler, an outlet steam lock connected to the other end of the boiler, inclined racks revoluble within the boiler, each of said locks consisting of a conduit with a pair of valves therein, the valves of each pair being spaced apart a distance equal to the length of said racks, means for imparting an intermittent orbital movement to the racks, and means for operating said valves in such timed relation as to admit containers by gravity from the inlet lock to one of the racks, and simultaneously discharge containers by gravity from another of the racks into the outlet steam lock.

10. In a cooker for food in containers, a steam boiler, an inlet steam lock connected to one end of the boiler, an outlet steam lock connected to the other end of the boiler, inclined racks revoluble with the boiler, the length of said inlet and outlet locks being equal to the length of said racks, means for admitting containers by gravity from the inlet lock to one of the racks and simultaneously discharging containers by gravity from another of the racks into the outlet steam lock, and means operating in alternation with the aforementioned means for feeding containers into the inlet steam lock and simultaneously discharging containers from the outlet steam lock.

11. In a cooker for food in containers, a steam boiler, an inlet steam lock connected to one end of the boiler, an outlet steam lock connected to the other end of the boiler, a plurality of inclined racks revoluble within the boiler, the length of said inlet and outlet locks being equal to the length of said racks, means for imparting an intermittent orbital movement to the racks, means for admitting containers from the inlet lock to one of said racks and simultaneously discharging containers from another of said racks into the outlet steam lock while said racks are stationary, and means for feeding containers into the inlet lock and simultaneously discharging containers from the outlet lock while said racks are in motion.

12. In a cooker for food in containers, a steam boiler, an inclined inlet steam lock adapted to communicate with one end thereof, an inclined outlet steam lock adapted to communicate with the other end thereof, inclined racks mounted to revolve within the boiler, means for intermittently progressing the racks to bring one rack into alinement with the inlet lock and an adjacent rack into alinement with the outlet lock at each step of progression of the racks, and means for operating said locks in timed relation to the progression of said racks for admitting containers from the inlet lock into the rack alined therewith and simultaneously discharging containers into the outlet lock from the rack alined with said outlet lock.

13. In a cooker for food in containers, an inclined steam boiler, an inlet steam lock connected with one end thereof, an outlet steam lock connected with the other end thereof, a plurality of inclined racks revoluble within the boiler, means for moving the racks intermittently whereby each rack is progressed step by step from a position of alinement with the inlet lock through an angle that is one step less than a complete revolution to a position of alinement with the outlet lock, means for operating said locks in timed relation to the movement of said racks for simultaneously opening said locks to the boiler to admit containers from the inlet lock into one of the racks and discharge containers into the outlet lock from another of the racks while said racks are held stationary, and means operating in timed relation with the progression of said racks for simultaneously admitting containers to the inlet lock and discharging containers from the outlet lock while the racks are in motion.

14. In a machine of the character described, a conduit through which cylindrical containers are adapted to roll, the conduit being of substantially rectangular section and the internal face of lateral walls thereof being medially recessed.

15. In a machine of the character described, a conduit through which cylindrical containers are adapted to roll, the conduit being of substantially rectangular section and the internal faces of all the walls of the conduit being medially recessed.

16. A chute through which a cylindrical object is adapted to roll, comprising four parallel inwardly facing angle bars mutually spaced apart and adapted to engage the ends of the object and the top and bottom thereof, and a shell encasing said angle bars.

17. A conduit through which a cylindrical object is adapted to roll, comprising a casing of rectangular cross-section, and an inwardly facing angle bar in the casing at each corner thereof, the upright flanges of the angle bars being of less height than the radius of the cylindrical object.

18. A chute for cylindrical objects, comprising a casing of rectangular cross-section, and an inwardly facing angle bar within the casing at each corner thereof, the flanges of the angle bars being of less width than the radius of the cylindrical object.

19. In a cooker for food in containers, a steam boiler, a plurality of racks in the boiler, a steam lock adapted to communicate with one end of the boiler, a drive shaft, mechanism connecting the drive shaft with the racks to bring individual racks successively into communication with the steam lock, steam actuated gate valves at each end of the steam lock, and steam inlet and outlet valves actuated by the drive shaft for operating said gate valves in timed relation.

20. In a cooker for food in containers, a steam boiler containing a plurality of racks, a steam lock, a gate at each end of the steam lock, steam actuated mechanism for opening said gates and non-positive means for closing said gates, a drive shaft, means operated by said shaft for bringing said racks intermittently and successively into communication with said steam lock, and valve mechanism operated by said drive shaft for controlling the opening and closing of said gate valves.

ALFRED L. ANDERSON.